(12) United States Patent
Mizoguchi et al.

(10) Patent No.: US 9,563,054 B2
(45) Date of Patent: Feb. 7, 2017

(54) OPTICAL DEVICE, OPTICAL SCANNER, AND IMAGE DISPLAY DEVICE

(71) Applicant: Seiko Epson Corporation, Tokyo (JP)

(72) Inventors: Yasushi Mizoguchi, Suwa (JP); Makiko Hino, Matsumoto (JP)

(73) Assignee: Seiko Epson Corporation (JP)

( * ) Notice: Subject to any disclaimer, the term of this patent is extended or adjusted under 35 U.S.C. 154(b) by 302 days.

(21) Appl. No.: 13/861,746

(22) Filed: Apr. 12, 2013

(65) Prior Publication Data

US 2013/0301100 A1    Nov. 14, 2013

(30) Foreign Application Priority Data

May 11, 2012   (JP) ................................ 2012-109185

(51) Int. Cl.
G02B 26/08     (2006.01)
G02B 26/10     (2006.01)

(52) U.S. Cl.
CPC ......... *G02B 26/0816* (2013.01); *G02B 26/101* (2013.01); *G02B 26/105* (2013.01)

(58) Field of Classification Search
CPC .. G02B 26/0816; G02B 26/101; G02B 26/105
USPC ......... 359/199.3, 200.7, 224.1, 221.2, 226.1; 310/36, 40 R, 48
See application file for complete search history.

(56) References Cited

U.S. PATENT DOCUMENTS

| | | | |
|---|---|---|---|
| 5,912,608 A | 6/1999 | Asada | |
| 7,697,181 B2 | 4/2010 | Mizoguchi | |
| 7,852,539 B2 | 12/2010 | Mizoguchi | |
| 2008/0094677 A1 | 4/2008 | Mizoguchi | |
| 2008/0218823 A1* | 9/2008 | Mizoguchi | 359/198 |
| 2010/0238533 A1 | 9/2010 | Nakamura et al. | |

(Continued)

FOREIGN PATENT DOCUMENTS

| | | |
|---|---|---|
| JP | 8322227 A | 12/1996 |
| JP | 2008-040240 A | 2/2008 |

(Continued)

OTHER PUBLICATIONS

Konishi, "Electro-Mechanical Converter, Spatial Optical Modulator, Exposure Device, and Methods for Manufacturing Them", WO2011080883 A1, machine translation.*

(Continued)

*Primary Examiner* — Bumsuk Won
*Assistant Examiner* — Wen Huang
(74) *Attorney, Agent, or Firm* — Harness, Dickey & Pierce, P.L.C.

(57) ABSTRACT

An optical scanner includes: a movable portion that includes a base portion and a light reflecting plate which is fixed to the base portion and includes a light reflecting portion with a light reflecting property and is rotatable about the Y-axis; a frame portion that is provided so as to surround the base portion and is rotatable about the X-axis perpendicular to the Y-axis; a shaft portion that supports the movable portion so as to be rotatable about the Y-axis with respect to the frame portion; and a permanent magnet that is provided in the frame portion. The light reflecting plate is provided such that it is separated from the shaft portion in a thickness direction and overlaps the shaft portion, as viewed from the thickness direction. The permanent magnet is fixed to a surface of the frame portion close to the light reflecting plate.

13 Claims, 11 Drawing Sheets

(56) References Cited

U.S. PATENT DOCUMENTS

| | | |
|---|---|---|
| 2011/0205608 A1 | 8/2011 | Mizoguchi |
| 2012/0086996 A1 | 4/2012 | Mizoguchi et al. |
| 2012/0147445 A1 | 6/2012 | Mizoguchi |

FOREIGN PATENT DOCUMENTS

| | | |
|---|---|---|
| JP | 2008-102362 A | 5/2008 |
| JP | 2008-216920 A | 9/2008 |
| JP | 2009-134196 A | 6/2009 |
| JP | 2010-217648 A | 9/2010 |
| JP | 2011-123363 A | 6/2011 |
| JP | 2011-137961 A | 7/2011 |
| JP | 2011-138046 A | 7/2011 |
| JP | 2011-138888 A | 7/2011 |
| JP | 2012-078738 A | 4/2012 |
| JP | 2012-108164 A | 6/2012 |
| JP | 2012-108165 A | 6/2012 |
| JP | 2012-123116 A | 6/2012 |
| JP | 2012-123117 A | 6/2012 |
| JP | 2012-123140 A | 6/2012 |
| JP | 2012-128307 A | 7/2012 |
| WO | WO-2011-080883 A1 | 7/2011 |
| WO | WO 2011080883 A1 * | 7/2011 |

OTHER PUBLICATIONS

Extended European Search Report for Application No. EP 13 16 7016 dated Jul. 23, 2013 (5 pages).

* cited by examiner

OPTICAL DEVICE, OPTICAL SCANNER, AND IMAGE DISPLAY DEVICE

BACKGROUND

1. Technical Field

The present invention relates to an optical device, an optical scanner, and an image display device.

2. Related Art

An optical scanner which performs two-dimensional scanning with light has been known as an optical device used in, for example, a projector (for example, see JP-A-2008-216920).

For example, the optical scanner disclosed in JP-A-2008-216920 includes a frame-shaped driving member, a pair of first shaft members that supports the driving member so as to be rotatable about the X-axis, a movable plate that is provided in the driving member and includes a light reflecting portion, and a pair of second shaft members that support the movable plate so as to be rotatable about the Y-axis perpendicular to the X-axis with respect to the driving member.

The optical scanner includes a permanent magnet that is provided in the driving member, a coil that is provided opposite to the permanent magnet, and a voltage applying unit that applies a voltage to the coil. A line connecting both poles of the permanent magnet is inclined with respect to each of the X-axis and the Y-axis in a plan view.

The voltage applying unit applies a superimposed voltage of a first voltage and a second voltage with different frequencies to the coil to rotate the movable plate about the Y-axis at the frequency of the second voltage while rotating the movable plate about the X-axis at the frequency of the first voltage. In this way, it is possible to perform two-dimensional scanning with light reflected from the light reflecting portion of the movable plate.

However, in the optical scanner disclosed in JP-A-2008-216920, since the first shaft member is directly connected to the side surface of the movable plate provided with the light reflecting portion, stress is applied to the movable plate due to the torsional deformation of the first shaft member during the rotation of the movable plate and the movable plate warps. As a result, it is difficult to accurately perform scanning with light.

SUMMARY

An advantage of some aspects of the invention is to provide an optical device, an optical scanner, and an image display device capable of performing two-dimensional scanning with light while preventing the warping of a light reflecting plate.

An aspect of the invention is directed to an optical device including: a movable portion that is rotatable about a first axis; a frame portion that is rotatable about a second axis intersecting the first axis; a first shaft portion that supports the movable portion so as to be rotatable about the first axis with respect to the frame portion; and a permanent magnet that is provided in the frame portion. The movable portion includes a base portion and a light reflecting plate which is fixed to the base portion and includes a light reflecting portion with a light reflecting property. The frame portion is provided so as to surround the base portion. The first shaft portion includes one end connected to the base portion and the other end connected to the frame portion. The light reflecting plate is provided so as to be separated from the first shaft portion in a thickness direction. The permanent magnet is fixed to a surface of the frame portion close to the light reflecting plate.

According to the optical device having the above-mentioned configuration, the movable portion can be rotated about the first axis and the second axis. Therefore, it is possible to perform two-dimensional scanning with light reflected from the light reflecting portion.

In particular, since the light reflecting plate is provided so as to be separated from the first shaft portion in the thickness direction, it is possible to reduce the warping of the light reflecting plate.

In the optical device according to the aspect of the invention, it is preferable that the base portion, the frame portion, and the first shaft portion are formed using a device layer of a Silicon-on-Insulator (SOI) substrate, and the light reflecting plate is provided on a handle layer side of the SOI substrate.

According to this configuration, it is possible to planarize the surface of a structure including the base portion, the frame portion, the first shaft portion, and the second shaft portion which is opposite to the light reflecting plate. Therefore, when the permanent magnet is provided with respect to the frame portion and when the light reflecting plate is provided with respect to the base portion, it is possible to support the frame portion and the base portion using a jig with a simple structure.

In the optical device according to the aspect of the invention, it is preferable that the light reflecting plate is fixed to the base portion through a spacer, and the permanent magnet is provided so as not to overlap the spacer, as viewed from the thickness direction of the light reflecting plate.

According to this configuration, it is possible to rotate the light reflecting plate while preventing contact with the first shaft portion, the frame portion, the second shaft portion, and the permanent magnet.

In the optical device according to the aspect of the invention, it is preferable that the permanent magnet includes a pair of permanent magnets which are opposite to each other with the spacer interposed therebetween.

According to this configuration, it is possible to smoothly rotate the frame portion about the second axis.

In the optical device according to the aspect of the invention, it is preferable that a rib which protrudes toward the light reflecting plate is formed on the frame portion.

According to this configuration, it is possible to improve the rigidity of the frame portion. In addition, since the rib protrudes toward the light reflecting plate, it is possible to form a surface of the frame portion opposite to the light reflecting plate and a surface of the base portion opposite to the light reflecting plate along the same plane. Therefore, when the permanent magnet is provided with respect to the frame portion and when the light reflecting plate is provided with respect to the base portion, it is possible to support the frame portion and the base portion using a jig with a simple structure.

In the optical device according to the aspect of the invention, it is preferable that the permanent magnet is fixed to a top surface of the rib.

According to this configuration, it is possible to rotate the movable portion about the first axis while preventing the contact of the base portion with the permanent magnet.

In the optical device according to the aspect of the invention, it is preferable that the rib is formed in a region which does not overlap the permanent magnet, as viewed from the thickness direction of the frame portion.

According to this configuration, it is possible to bring the center of gravity of a vibration system about the second axis close to the second axis. As a result, it is possible to smoothly rotate the light reflecting plate about the second axis.

In the optical device according to the aspect of the invention, it is preferable that the rib is formed so as to regulate the movement of the permanent magnet in a direction perpendicular to the thickness direction of the frame portion.

According to this configuration, it is possible to easily provide the permanent magnet with respect to the frame portion.

In the optical device according to the aspect of the invention, it is preferable that the light reflecting plate is provided so as to overlap at least a part of the first shaft portion, as viewed from the thickness direction.

According to this configuration, it is possible to reduce the size of the optical device.

In the optical device according to the aspect of the invention, it is preferable that the light reflecting plate is formed so as to cover the entire first shaft portion, as viewed from the thickness direction.

According to this configuration, it is possible to increase the area of the light reflecting portion. In addition, it is possible to prevent the generation of stray light due to the reflection of unnecessary light from the first shaft portion.

In the optical device according to the aspect of the invention, it is preferable that the light reflecting plate is formed so as to cover the entire frame portion, as viewed from the thickness direction.

According to this configuration, it is possible to increase the area of the light reflecting portion. In addition, it is possible to prevent the generation of stray light due to the reflection of unnecessary light from the frame portion.

In the optical device according to the aspect of the invention, it is preferable that the optical device further includes a second shaft portion that includes one end connected to the frame portion and supports the frame portion so as to be rotatable about the second axis, and the light reflecting plate is formed so as to cover the entire second shaft portion, as viewed from the thickness direction.

According to this configuration, it is possible to increase the area of the light reflecting portion. In addition, it is possible to prevent the generation of stray light due to the reflection of unnecessary light from the second shaft portion.

In the optical device according to the aspect of the invention, it is preferable that the optical device further includes a coil that is provided opposite to the frame portion and a voltage applying unit that applies a voltage to the coil, the permanent magnet is arranged such that one magnetic pole and the other magnetic pole are opposite to each other with the second axis interposed therebetween, as viewed from the thickness direction of the frame portion, and is magnetized in a direction which is inclined with respect to the first axis and the second axis, the voltage applying unit applies, to the coil, a superimposed voltage of a first voltage with a first frequency and a second voltage with a second frequency different from the first frequency, and the movable portion is rotated about the first axis at the first frequency and is rotated about the second axis at the second frequency.

According to this configuration, it is possible to rotate the light reflecting plate about the first axis and the second axis while reducing the number of components.

In the optical device according to the aspect of the invention, it is preferable that the permanent magnet has a longitudinal shape and is magnetized in a longitudinal direction, and the end of permanent magnet is arranged on the first axis, as viewed from the thickness direction of the frame portion.

According to this configuration, it is possible to smoothly rotate the light reflecting plate about the second axis.

Another aspect of the invention is directed to an optical scanner including: a movable portion that is rotatable about a first axis; a frame portion that is rotatable about a second axis intersecting the first axis; a first shaft portion that supports the movable portion so as to be rotatable about the first axis with respect to the frame portion; and a permanent magnet that is provided in the frame portion. The movable portion includes a base portion and a light reflecting plate which is fixed to the base portion and includes a light reflecting portion with a light reflecting property. The frame portion is provided so as to surround the base portion. The first shaft portion includes one end connected to the base portion and the other end connected to the frame portion. The light reflecting plate is provided so as to be separated from the first shaft portion in a thickness direction. The permanent magnet is fixed to a surface of the frame portion close to the light reflecting plate.

According to the optical scanner having the above-mentioned configuration, it is possible to perform two-dimensional scanning with light while reducing the size of a device.

Still another aspect of the invention is directed to an image display device including: a movable portion that is rotatable about a first axis; a frame portion that is rotatable about a second axis intersecting the first axis; a first shaft portion that supports the movable portion so as to be rotatable about the first axis with respect to the frame portion; and a permanent magnet that is provided in the frame portion. The movable portion includes a base portion and a light reflecting plate which is fixed to the base portion and includes a light reflecting portion with a light reflecting property. The frame portion is provided so as to surround the base portion. The first shaft portion includes one end connected to the base portion and the other end connected to the frame portion. The light reflecting plate is provided so as to be separated from the first shaft portion in a thickness direction. The permanent magnet is fixed to a surface of the frame portion close to the light reflecting plate.

According to the image display device having the above-mentioned configuration, it is possible to perform two-dimensional scanning with light while reducing the size of a device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an optical device, an optical scanner, and an image display device according to exemplary embodiments of the invention will be described with reference to the accompanying drawings. In the following embodiments, a representative example in which the optical device according to the invention is applied to the optical scanner will be described.

First Embodiment

Figure 1:
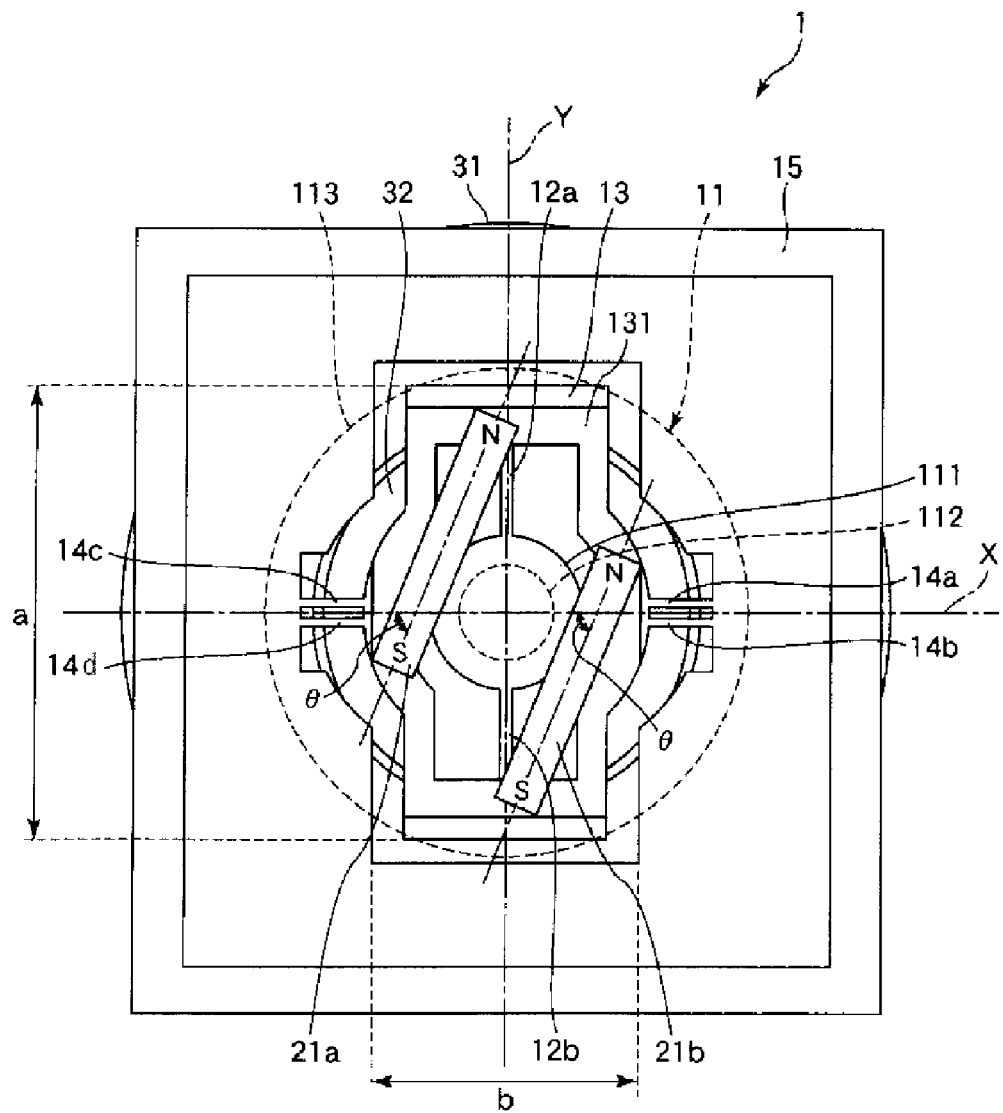
FIG. 1 is a plan view illustrating an optical scanner (optical device) according to a first embodiment of the invention.
Figure 2:
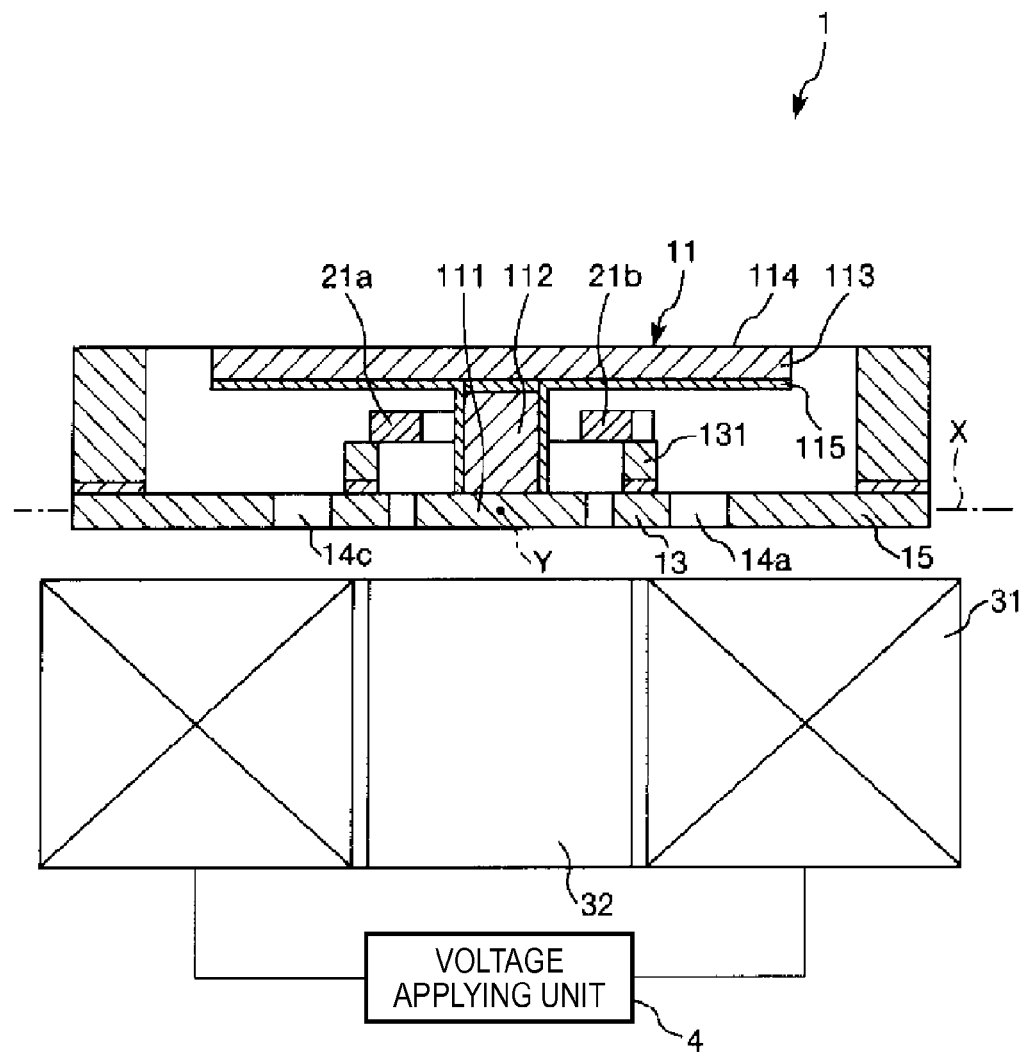
FIG. 2 is a cross-sectional view (a cross-sectional view taken along the X-axis) illustrating the optical scanner shown in FIG. 1.
Figure 3:
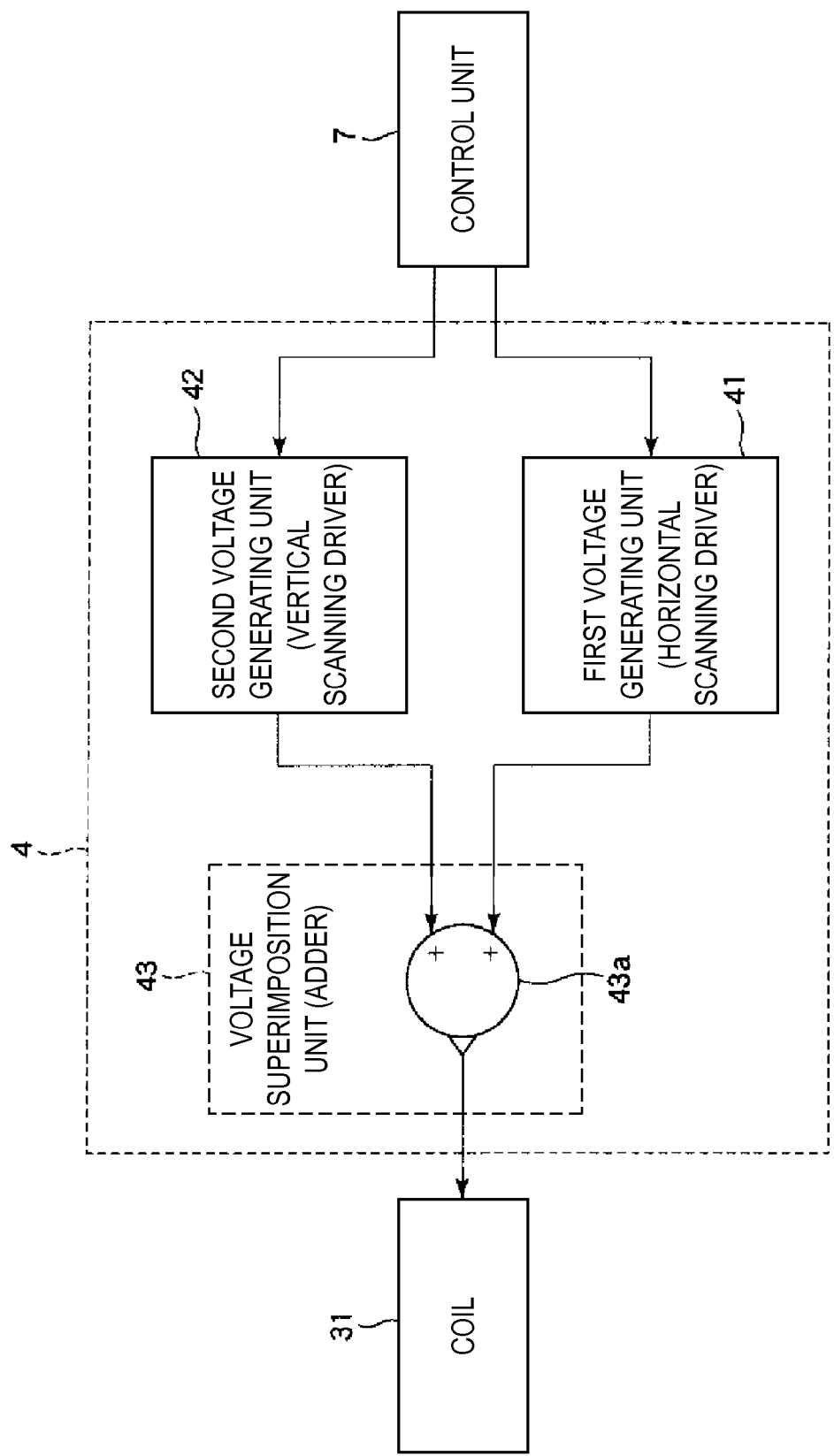
FIG. 3 is a block diagram illustrating a voltage applying unit of a driving unit included in the optical scanner shown in FIG. 1.
Figure 4A:
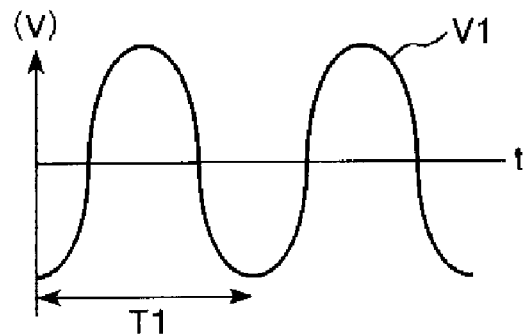
FIGS. 4A and 4B are diagrams illustrating examples of voltages generated by a first voltage generating unit and a second voltage generating unit shown in FIG. 3.
Figure 4B:
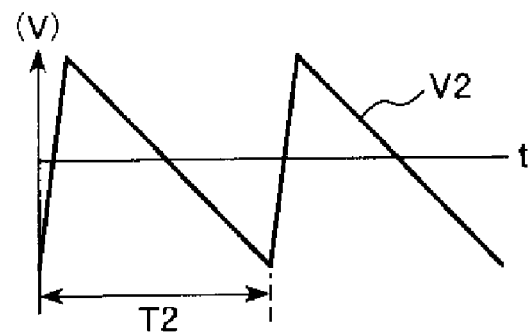

FIG. 1 is a plan view illustrating an optical scanner (optical device) according to a first embodiment of the invention. FIG. 2 is a cross-sectional view illustrating the optical scanner shown in FIG. 1 (a cross-sectional view taken along the X-axis). FIG. 3 is a block diagram illustrating a voltage applying unit of a driving unit included in the optical scanner shown in FIG. 1. FIGS. 4A and 4B are diagrams illustrating examples of voltages generated by a first voltage generating unit and a second voltage generating unit shown in FIG. 3. Hereinafter, for convenience of explanation, the upper and lower sides of FIG. 2 are referred to as "upper" and "lower" sides.

As shown in FIGS. 1 and 2, the optical scanner 1 includes a movable portion 11, a pair of shaft portions 12a and 12b (first shaft portions), a frame portion 13, two pairs of shaft portions 14a, 14b, 14c, and 14d (second shaft portions), a supporting portion 15, permanent magnets 21a and 21b, a coil 31, a magnetic core 32, and a voltage applying unit 4.

The movable portion 11 and the pair of shaft portions 12a and 12b form a first vibration system that is rotated (reciprocatively rotated) about the Y-axis (first axis) aligned with the shaft portions 12a and 12b. In addition, the movable portion 11, the pair of shaft portion 12a and 12b, the frame portion 13, the two pairs of shaft portions 14a, 14b, 14c, and 14d, and the permanent magnet 21a and 21b form a second vibration system that is rotated (reciprocatively rotated) about the X-axis (second axis) aligned with the two pairs of shaft portions 14a, 14b, 14c, and 14d.

The permanent magnets 21a and 21b, the coil 31, and the voltage applying unit 4 form the driving unit that drives the first vibration system and the second vibration system (that is, rotates the movable portion 11 about the X-axis and the Y-axis).

Next, each unit of the optical scanner 1 will be sequentially described in detail.

The movable portion 11 includes a base portion 111 and a light reflecting plate 113 which is fixed to the base portion 111 through a spacer 112.

A light reflecting portion 114 with a light reflecting property is provided on the upper surface (one surface) of the light reflecting plate 113.

The light reflecting plate 113 is separated from the shaft portions 12a and 12b in the thickness direction and overlaps the shaft portions 12a and 12b, as viewed from the thickness direction (hereinafter, referred to as "in a plan view").

Therefore, it is possible to increase the area of the surface of the light reflecting plate 113 while reducing the distance between the shaft portion 12a and the shaft portion 12b. Since the distance between the shaft portion 12a and the shaft portion 12b can be reduced, it is possible to reduce the size of the frame portion 13. Since the size of the frame portion 13 can be reduced, it is possible to reduce the distance between the shaft portions 14a and 14b and the shaft portions 14c and 14d.

In this way, even when the area of the surface of the light reflecting plate 113 increases, it is possible to reduce the size of the optical scanner 1.

Since the light reflecting plate 113 is separated from the shaft portions 12a and 12b in the thickness direction, that is, the shaft portions 12a and 12b are not directly connected to the light reflecting plate 113, it is possible to prevent or suppress the application of stress to the light reflecting plate 113 due to the torsional deformation of the shaft portions 12a and 12b during the rotation of the light reflecting plate 113. As a result, it is possible to reduce the warping of the light reflecting plate 113.

The permanent magnets 21a and 21b are fixed to the surface of the frame portion 13 close to the light reflecting plate 113. Therefore, for example, it is possible to reduce the length of the optical scanner 1 in the vertical direction in FIG. 2, as compared to a case in which the permanent magnets 21a and 21b are fixed to the surface of the frame portion 13 opposite to the light reflecting plate 113. As a result, it is possible to reduce the size of the optical scanner.

The light reflecting plate 113 is formed so as to cover the entire shaft portions 12a and 12b in a plan view. In other words, each of the shaft portions 12a and 12b is disposed inside the outer circumference of the light reflecting plate 113 in a plan view. Therefore, the area of the surface of the light reflecting plate 113 increases. As a result, it is possible to increase the area of the light reflecting portion 114. In addition, it is possible to prevent the generation of stray light due to the reflection of unnecessary light from the shaft portions 12a and 12b.

The light reflecting plate 113 is formed so as to cover the entire frame portion 13 in a plan view. In other words, the frame portion 13 is disposed inside the outer circumference of the light reflecting plate 113 in a plan view. Therefore, the area of the surface of the light reflecting plate 113 increases. As a result, it is possible to increase the area of the light reflecting portion 114. In addition, it is possible to prevent the generation of stray light due to the reflection of unnecessary light from the frame portion 13.

The light reflecting plate 113 is formed so as to cover all of the shaft portions 14a, 14b, 14c, and 14d in a plan view. In other words, each of the shaft portions 14a, 14b, 14c, and 14d is disposed inside the outer circumference of the light reflecting plate 113 in a plan view. Therefore, the area of the surface of the light reflecting plate 113 increases. As a result, it is possible to increase the area of the light reflecting portion 114. In addition, it is possible to prevent the generation of stray light due to the reflection of unnecessary light from the shaft portions 14a, 14b, 14c, and 14d.

In this embodiment, the light reflecting plate 113 has a circular shape in a plan view. The planar shape of the light reflecting plate 113 is not limited thereto, but may be, for example, an ellipse or a polygon such as a rectangle.

A hard layer 115 is provided on the lower surface (the other surface) of the light reflecting plate 113.

The hard layer 115 is made of a material harder than that forming the body of the light reflecting plate 113. In this way, it is possible to increase the rigidity of the light reflecting plate 113. Therefore, it is possible to prevent or suppress the warping of the light reflecting plate 113 during rotation. In addition, the thickness of the light reflecting plate 113 is reduced to suppress the moment of inertia when the light reflecting plate 113 is rotated about the X-axis and the Y-axis.

The hard layer 115 may be made of any material harder than that forming the body of the light reflecting plate 113. For example, diamond, a carbon nitride film, crystal, sapphire, lithium tantalate, or potassium niobate may be used as the material forming the hard layer 115. In particular, it is preferable to use diamond as the material.

The thickness (average) of the hard layer 115 is not particularly limited. For example, the thickness is preferably in the range of about 1 μm to 10 μm and more particularly in the range of about 1 μm to 5 μm.

The hard layer 115 may be a single layer or a laminate of a plurality of layers. The hard layer 115 is provided if necessary and may be omitted.

The hard layer 115 may be formed by, for example, a chemical vapor deposition (CVD) method, such as plasma CVD, thermal CVD, or laser CVD, a dry plating method, such as vacuum deposition, sputtering, or ion plating, a wet plating method, such as electrolytic plating, immersion plating, or electroless plating, thermal spraying, and a sheet-shaped member bonding method.

The lower surface of the light reflecting plate 113 is fixed to the base portion 111 through the spacer 112. In this way, it is possible to rotate the light reflecting plate 113 about the Y-axis while preventing the contact of the light reflecting plate 113 with the shaft portions 12a and 12b, the frame portion 13, and the shaft portions 14a, 14b, 14c, and 14d.

Each base portion 111 is disposed inside the outer circumference of the light reflecting plate 113 in a plan view. It is preferable that the area of the base portion 111 in a plan view be as small as possible as long as the base portion 111 can support the light reflecting plate 113 through the spacer 112. In this way, it is possible to reduce the distance between the shaft portion 12a and the shaft portion 12b while increasing the area of the surface of the light reflecting plate 113.

The frame portion 13 has a frame shape and is provided so as to surround the base portion 111 of the movable portion 11. In other words, the base portion 111 of the movable portion 11 is provided inside the frame portion 13 having the frame shape.

The frame portion 13 is supported by the supporting portion 15 through the shaft portions 14a, 14b, 14c, and 14d. The base portion 111 of the movable portion 11 is supported by the frame portion 13 through the shaft portions 12a and 12b.

The length of the frame portion 13 in a direction along the Y-axis is more than the length thereof in a direction along the X-axis. That is, when the length of the frame portion 13 in the direction along the Y-axis is "a" and the length of the frame portion 13 in the direction along the X-axis is "b", a>b is satisfied. In this way, it is possible to suppress the length of the optical scanner 1 in the direction along the X-axis while ensuring the necessary length of the shaft portions 12a and 12b.

The frame portion 13 has a shape corresponding to the outer shape of a structure including the base portion 111 of the movable portion 11 and the pair of shaft portions 12a and 12b in a plan view. In this way, it is possible to reduce the size of the frame portion 13 while permitting the vibration of the first vibration system including the movable portion 11, the pair of shaft portions 12a and 12b, and the permanent magnets 21a and 21b, that is, the rotation of the movable portion 11 about the Y-axis.

The shape of the frame portion 13 is not limited to that shown in the drawings as long as the frame portion 13 has a frame shape.

Each of the shaft portions 12a and 12b and the shaft portions 14a, 14b, 14c, and 14d can be elastically deformed.

The shaft portions 12a and 12b connect the movable portion 11 and the frame portion 13 such that the movable portion 11 can be rotated (oscillated) about the Y-axis (first axis). The shaft portions 14a, 14b, 14c, and 14d connect the frame portion 13 and the supporting portion 15 such that the frame portion 13 can be rotated (oscillated) about the X-axis (second axis) perpendicular to the Y-axis.

The shaft portions 12a and 12b are arranged so as to be opposite to each other with the base portion 111 of the movable portion 11 interposed therebetween. In addition, each of the shaft portions 12a and 12b has a longitudinal shape which extends in the direction along the Y-axis. Each of the shaft portions 12a and 12b has one end connected to the base portion 111 and the other end connected to the frame portion 13. Each of the shaft portions 12a and 12b is arranged such that the central axis thereof is aligned with the Y-axis.

The shaft portions 12a and 12b are torsionally deformed with the rotation of the movable portion 11 about the Y-axis.

The shaft portions 14a and 14b and the shaft portions 14c and 14d are arranged so as to be opposite to each other with the frame portion 13 interposed therebetween. Each of the shaft portions 14a, 14b, 14c, and 14d has a longitudinal shape which extends in the direction along the X-axis. Each of the shaft portions 14a, 14b, 14c, and 14d has one end connected to the frame portion 13 and the other end connected to the supporting portion 15. The shaft portions 14a and 14b are arranged so as to be opposite to each other with the X-axis interposed therebetween. Similarly, the shaft portions 14c and 14d are arranged so as to be opposite to each other with the X-axis interposed therebetween.

For the shaft portions 14a, 14b, 14c, and 14d, the entire shaft portions 14a and 14b and the entire shaft portions 14c and 14d are torsionally deformed with the rotation of the frame portion 13 about the X-axis.

As such, since the movable portion 11 can be rotated about the Y-axis and the frame portion 13 can be rotated about the X-axis, it is possible to rotate the movable portion 11 about two axes, that is, the X-axis and the Y-axis perpendicular to each other.

The shapes of the shaft portions 12a and 12b and the shaft portions 14a, 14b, 14c, and 14d are not limited to the above-mentioned shapes. For example, each of the shaft portions 12a and 12b and the shaft portions 14a, 14b, 14c, and 14d may include at least one curved or bent portion or at least one branched portion.

The base portion 111, the shaft portions 12a and 12b, the frame portion 13, the shaft portions 14a, 14b, 14c, and 14d, and the supporting portion 15 are integrally formed.

In this embodiment, the base portion 111, the shaft portions 12a and 12b, the frame portion 13, the shaft portions 14a, 14b, 14c, and 14d, and the supporting portion 15 are formed by etching an SOI substrate which includes a first Si layer (device layer), a $SiO_2$ layer (box layer), and a second Si layer (handle layer) formed in this order. In this way, the first vibration system and the second vibration system can have good vibration characteristics. The SOI substrate can be finely processed by etching. Therefore, when the SOI substrate is used to form the base portions 111, the shaft portions 12a and 12b, the frame portion 13, the shaft portions 14a, 14b, 14c, and 14d, and the supporting portion 15, it is possible to improve the accuracy of the dimensions of the components. In addition, it is possible to reduce the size of the optical scanner 1.

Each of the base portion 111, the shaft portions 12a and 12b, and the shaft portions 14a, 14b, 14c, and 14d is formed by the first Si layer of the SOI substrate. Therefore, it is possible to improve the elasticity of the shaft portions 12a and 12b and the shaft portions 14a, 14b, 14c, and 14d. In addition, it is possible to prevent the contact of the base portion 111 with the frame portion 13 when the base portion 111 is rotated about the Y-axis.

Each of the frame portion 13 and the supporting portion 15 is formed by a laminate of the first Si layer, the $SiO_2$ layer, and the second Si layer of the SOI substrate. Therefore, it is possible to improve the rigidity of the frame portion 13 and the supporting portion 15. In addition, the $SiO_2$ layer and the second Si layer of the frame portion 13 form a rib 131.

The light reflecting plate 113 is provided on the handle layer side (the side where the frame portion 13 and the supporting portion 15 protrude) of the base portion 111 which is formed using the device layer of the SOI substrate. In this way, a surface of the structure including the base portion 111, the frame portion 13, the shaft portion 12a and 12b, and the shaft portion 14a, 14b, 14c, and 14d which is opposite to the light reflecting plate 113 can be planarized. Therefore, when the permanent magnets 21a and 21b are provided with respect to the frame portion 13 and when the light reflecting plate 113 is provided with respect to the base portion 111, it is possible to support the frame portion 13 and the base portion 111 using a jig with a simple structure.

Since the rib 131 which protrudes toward the light reflecting plate 113 (upper side) is provided on the frame portion 13, it is possible to improve the rigidity of the frame portion 13. Since the rib 131 protrudes toward the light reflecting plate 113, the surface of the frame portion 13 opposite to the light reflecting plate 113 and the surface of the base portion 111 opposite to the light reflecting plate 113 can be formed along the same plane. Therefore, when the permanent magnets 21a and 21b are provided with respect to the frame portion 13 and when the light reflecting plate 113 is provided with respect to the base portion 111, it is possible to support the frame portion 13 and the base portion 111 using a jig with a simple structure.

It is preferable that an antireflection treatment be performed for the upper surface of the supporting portion 15. In this way, it is possible to prevent the generation of stray light due to unnecessary light emitted to the supporting portion 15.

The antireflection treatment is not particularly limited. Examples of the antireflection treatment include the formation of an antireflection film (dielectric multi-layer film), a surface roughening process, and a blackening process.

The materials forming the base portion 111, the shaft portions 12a and 12b, and the shaft portions 14a, 14b, 14c, and 14d and the methods of forming them are illustrative examples, but the invention is not limited thereto.

In this embodiment, the spacer 112 and the light reflecting plate 113 are also formed by etching the SOI substrate. The spacer 112 is formed by a laminate of the $SiO_2$ layer and the second Si layer in the SOI substrate. The light reflecting plate 113 is formed by the first Si layer of the SOI substrate.

As such, since the SOI substrate is used to form the spacer 112 and the light reflecting plate 113, it is possible to simply manufacture the spacer 112 and the light reflecting plate 113 bonded to each other with high accuracy.

The spacer 112 is bonded to the base portion 111 by a bonding material (not shown) such as an adhesive or brazing filler metal. The spacer 112 is bonded to (provided on) the base portion 111 after the permanent magnets 21a and 21b are bonded to (provided on) the frame portion 13.

The permanent magnets 21a and 21b are bonded and fixed to the upper surface (the surface close to the light reflecting plate 113) of the frame portion 13. In this way, it is possible to provide the permanent magnets 21a and 21b with respect to the frame portion 13 and provide the light reflecting plate 113 with respect to the base portion 111 with ease.

A method of bonding the permanent magnets 21a and 21b and the frame portion 13 is not particularly limited. For example, a bonding method using an adhesive may be used.

In this embodiment, the permanent magnets 21a and 21b are fixed to the top surfaces (upper surfaces) of the ribs 131 provided on the frame portion 13. Therefore, the rib 131 also functions as a spacer and it is possible to rotate the movable portion 11 about the Y-axis while preventing the contact of the base portion 111 with the permanent magnets 21a and 21b.

The permanent magnets 21a and 21b are provided so as not to overlap the spacer 112 of the movable portion 11 in a plan view. Therefore, it is possible to rotate the light reflecting plate 113 while preventing contact with the shaft portions 12a and 12b, the frame portion 13, the shaft portions 14a, 14b, 14c, and 14d, and the permanent magnets 21a and 21b.

The pair of permanent magnets 21a and 21b are opposite to each other with the spacer 112 interposed therebetween. Therefore, it is possible to smoothly rotate the frame portion 13 about the second axis.

The permanent magnets 21a and 21b are arranged such that one magnetic pole and the other magnetic pole are opposite to each other with the X-axis interposed therebetween in a plan view and are magnetized in a direction which is inclined with respect to the X-axis and the Y-axis.

In this embodiment, the permanent magnets 21a and 21b each have a longitudinal shape (rod shape) which extends in a direction inclined with respect to the X-axis and the Y-axis. The permanent magnets 21a and 21b are each magnetized in the longitudinal direction. That is, the permanent magnets 21a and 21b are each magnetized such that one end thereof is the S pole and the other end is the N pole.

In addition, one (upper in FIG. 1) end (N pole) of the permanent magnet 21a is arranged on the Y-axis in a plan view. Similarly, one (lower in FIG. 1) end (S pole) of the permanent magnet 21b is arranged on the Y-axis. Therefore, it is possible to smoothly rotate the light reflecting plate 113 about the X-axis.

The permanent magnets 21a and 21b are provided so as to be symmetric (point-symmetric) with an intersection of the X-axis and the Y-axis in a plan view.

The tilt angle θ of the magnetization direction (extension direction) of each of the permanent magnets 21a and 21b with respect to the X-axis is not particularly limited, but is preferably equal to or more than 30° and equal to or less than 60°, more preferably, equal to or more than 45° and equal to or less than 60°, and most preferably, 45°. When the permanent magnets 21a and 21b are provided in this way, it is possible to smoothly and reliably rotate the movable portion 11 about the X-axis.

On the other hand, when the tilt angle θ is less than the lower limit, in some cases, it is difficult to sufficiently rotate the movable portion 11 about the X-axis according to conditions, such as the level of the voltage applied from the voltage applying unit 4 to the coil 31. When the tilt angle θ is more than the upper limit, in some cases, it is difficult to sufficiently rotate the movable portion 11 about the Y-axis according to conditions.

For example, a neodymium magnet, a ferrite magnet, a samarium-cobalt magnet, an alnico magnet, or a bonded magnet may be appropriately used as each of the permanent magnets 21a and 21b. Each of the permanent magnets 21a and 21b is formed by magnetizing a hard magnetic material. For example, each permanent magnet is formed by arranging a hard magnetic material before magnetization on the frame portion 13 and magnetizing the hard magnetic material. When the magnetized permanent magnets 21a and 21b are provided on the frame portion 13, in some cases, it is difficult to arrange the permanent magnets 21a and 21b at desired positions due to the influence of the magnetic field of the permanent magnets 21a and 21b or the external magnetic field.

The coil 31 is provided immediately below the permanent magnets 21a and 21b. That is, the coil 31 is provided so as to face the lower surface of the frame portion 13. In this way, it is possible to effectively apply the magnetic field generated from the coil 31 to the permanent magnets 21a and 21b. Therefore, it is possible to reduce the power and size of the optical scanner 1.

In this embodiment, the coil 31 is wound around the magnetic core 32. Therefore, it is possible to effectively apply the magnetic field generated by the coil 31 to the permanent magnets 21a and 21b. The magnetic core 32 may be omitted.

The coil 31 is electrically connected to the voltage applying unit 4.

When the voltage applying unit 4 applies a voltage to the coil 31, the magnetic field having magnetic flux perpendicular to the X-axis and the Y-axis is generated from the coil 31.

As shown in FIG. 3, the voltage applying unit 4 includes a first voltage generating unit 41 that generates a first voltage V1 for driving the movable portion 11 about the Y-axis, a second voltage generating unit 42 that generates a second voltage V2 for rotating the movable portion 11 about the X-axis, and a voltage superimposition unit 43 that superimposes the first voltage V1 and the second voltage V2, and applies the voltage superimposed by the voltage superimposition unit 43 to the coil 31.

As shown in FIG. 4A, the first voltage generating unit 41 generates the first voltage V1 (horizontal scanning voltage) which is periodically changed with a period T1. That is, the first voltage generating unit 41 generates the first voltage V1 with a first frequency (1/T1).

The first voltage V1 has the waveform of a sine wave. Therefore, the optical scanner 1 can effectively perform main scanning with light. The waveform of the first voltage V1 is not limited thereto.

The first frequency (1/T1) is not particularly limited as long as it is suitable for horizontal scanning. However, it is preferable that the first frequency be in the range of 10 kHz to 40 kHz.

In this embodiment, the first frequency is set to be equal to the torsional resonance frequency (f1) of the first vibration system (torsion vibration system) including the movable portion 11 and the pair of shaft portions 12a and 12b. That is, the first vibration system is designed (manufactured) such that the torsional resonance frequency f1 thereof is suitable for horizontal scanning. Therefore, it is possible to increase the rotation angle of the movable portion 11 about the Y-axis.

As shown in FIG. 4B, the second voltage generating unit 42 generates the second voltage V2 (vertical scanning voltage) that is periodically changed with a period T2 different from the period T1. That is, the second voltage generating unit 42 generates the second voltage V2 with a second frequency (1/T2).

The second voltage V2 has the waveform of a sawtooth wave. Therefore, the optical scanner 1 can effectively perform vertical scanning (sub-scanning) with light. The waveform of the second voltage V2 is not limited thereto.

The second frequency (1/T2) is different from the first frequency (1/T1) and is not particularly limited as long as it is suitable for vertical scanning. However, it is preferable that the second frequency be in the range of 30 Hz to 120 Hz (about 60 Hz). As such, when the frequency of the second voltage V2 is about 60 Hz and the frequency of the first voltage V1 is in the range of 10 kHz to 40 kHz as described above, it is possible to rotate the movable portion 11 about two axes (the X-axis and the Y-axis) perpendicular to each other at a frequency which is suitable to draw an image in the display. However, a combination of the frequency of the first voltage V1 and the frequency of the second voltage V2 is not particularly limited as long as the movable portion 11 can be rotated about each of the X-axis and the Y-axis.

In this embodiment, the frequency of the second voltage V2 is adjusted to be different from the torsional resonance frequency (resonance frequency) of the second vibration system (torsion vibration system) including the movable portion 11, the pair of shaft portions 12a and 12b, the frame portion 13, the two pairs of shaft portions 14a, 14b, 14c, and 14d, and the permanent magnets 21a and 21b.

It is preferable that the frequency (second frequency) of the second voltage V2 be lower than the frequency (first frequency) of the first voltage V1. That is, it is preferable that the period T2 is longer than the period T1. In this way, it is possible to reliably and smoothly rotate the movable portion 11 about the X-axis at the second frequency while rotating the movable portion 11 about the Y-axis at the first frequency.

When the torsional resonance frequency of the first vibration system is f1 [Hz] and the torsional resonance frequency of the second vibration system is f2 [Hz], the frequencies f1 and f2 preferably satisfy the relationship f2<f1 and more preferably the relationship $f1 \geq 10f2$. In this way, it is possible to rotate the movable portion 11 about the X-axis at the frequency of the second voltage V2 while rotating the movable portion 11 about the Y-axis at the frequency of the first voltage V1. On the other hand, when the frequencies f1 and f2 satisfy the relationship $f1 \leq 10f2$, the first vibration system is likely to vibrate due to the second frequency.

Each of the first voltage generating unit 41 and the second voltage generating unit 42 is connected to a control unit 7 and is driven on the basis of signals from the control unit 7. The voltage superimposition unit 43 is connected to the first voltage generating unit 41 and the second voltage generating unit 42.

The voltage superimposition unit 43 includes an adder 43a for applying a voltage to the coil 31. The adder 43a receives the first voltage V1 from the first voltage generating unit 41, receives the second voltage V2 from the second voltage generating unit 42, superimposes the voltages, and applies the superimposed voltage to the coil 31.

Next, a method of driving the optical scanner 1 will be described. In this embodiment, as described above, the frequency of the first voltage V1 is set to be equal to the torsional resonance frequency of the first vibration system and the frequency of the second voltage V2 is set to a value that is different from the torsional resonance frequency of the second vibration system and is less than the frequency of the first voltage V1 (for example, the frequency of the first voltage V1 is set to 18 kHz and the frequency of the second voltage V2 is set to 60 Hz).

For example, the voltage superimposition unit 43 superimposes the first voltage V1 shown in FIG. 4A and the second voltage V2 shown in FIG. 4B and applies the superimposed voltage to the coil 31.

Then, the first voltage V1 causes the magnetic field (this magnetic field is referred to as a "magnetic field A1") for attracting one end (N pole) of each of the permanent magnets 21a and 21b to the coil 31 and for repulsing the other end (S pole) of each of the permanent magnets 21a and 21b from the coil 31 and the magnetic field (this magnetic field is referred to as a "magnetic field A2") for repulsing one end (N pole) of each of the permanent magnets 21a and 21b from the coil 31 and for attracting the other end (S pole) of each of the permanent magnets 21a and 21b to the coil 31 to be alternately switched.

In the plan view of FIG. 1, the S pole of the permanent magnet 21a is disposed on one side of the Y-axis and the N pole of the permanent magnet 21b is disposed on the other side. Therefore, when the magnetic field A1 and the magnetic field A2 are alternately switched, vibration with a torsional vibration component about the Y-axis is applied to the frame portion 13. With the vibration, the movable portion 11 is rotated about the Y-axis at the frequency of the first voltage V1 while the shaft portions 12a and 12b are being torsionally deformed.

The frequency of the first voltage V1 is equal to the torsional resonance frequency of the first vibration system. Therefore, it is possible to effectively rotate the movable portion 11 about the Y-axis using the first voltage V1. That is, even when vibration with a torsional vibration component about the Y-axis of the frame portion 13 is small, it is possible to increase the rotation angle of the movable portion 11 about the Y-axis associated with the vibration.

The second voltage V2 causes the magnetic field (this magnetic field is referred to as a "magnetic field B1") for attracting one end (N pole) of each of the permanent magnets 21a and 21b to the coil 31 and for repulsing the other end (S pole) of each of the permanent magnets 21a and 21b from the coil 31 and the magnetic field (this magnetic field is referred to as a "magnetic field B2") for repulsing one end (N pole) of each of the permanent magnets 21a and 21b from the coil 31 and for attracting the other end (S pole) of each of the permanent magnets 21a and 21b to the coil 31 to be alternately switched.

In the plan view of FIG. 1, the N pole of each of the permanent magnets 21a and 21b is disposed on one side of the X-axis and the S pole of each of the permanent magnets 21a and 21b is disposed on the other side. Therefore, when the magnetic field B1 and the magnetic field B2 are alternately switched, the frame portion 13 and the movable portion 11 are rotated about the X-axis at the frequency of the second voltage V2 while the shaft portions 14a and 14b and the shaft portions 14c are 14d are being torsionally deformed.

The frequency of the second voltage V2 is set to be significantly less than the frequency of the first voltage V1. In addition, the torsional resonance frequency of the second vibration system is designed to be less than the torsional resonance frequency of the first vibration system. Therefore, it is possible to prevent the movable portion 11 from being rotated about the Y-axis at the frequency of the second voltage V2.

As described above, in the optical scanner 1, since the superimposed voltage of the first voltage V1 and the second voltage V2 is applied to the coil 31, it is possible to rotate the movable portion 11 about the X-axis at the frequency of the second voltage V2 while rotating the movable portion 11 about the Y-axis at the frequency of the first voltage V1. Therefore, the costs and size of the device can be reduced and the movable portion 11 can be rotated about each of the X-axis and the Y-axis by an electromagnetic driving method (moving magnet method). In addition, since the number of components (the permanent magnets and the coil) forming the driving source can be reduced, it is possible to achieve a simple and small device. Since the coil 31 is separated from the vibration system of the optical scanner 1, it is possible to prevent the adverse effect of heat generated from the coil 31 on the vibration system.

In particular, since the light reflecting plate 113 is separated from the shaft portions 12a and 12b in the thickness direction and overlaps the shaft portions 12a and 12b, as viewed from the thickness direction, it is possible to reduce the size of the optical scanner 1.

In addition, since the permanent magnets 21a and 21b are fixed to the surface of the frame portion 13 close to the light reflecting plate 113, it is possible to easily provide the permanent magnets 21a and 21b with respect to the frame portion 13 and provide the light reflecting plate 113 with respect to the base portion 111.

Second Embodiment

Next, a second embodiment of the invention will be described.

Figure 5:
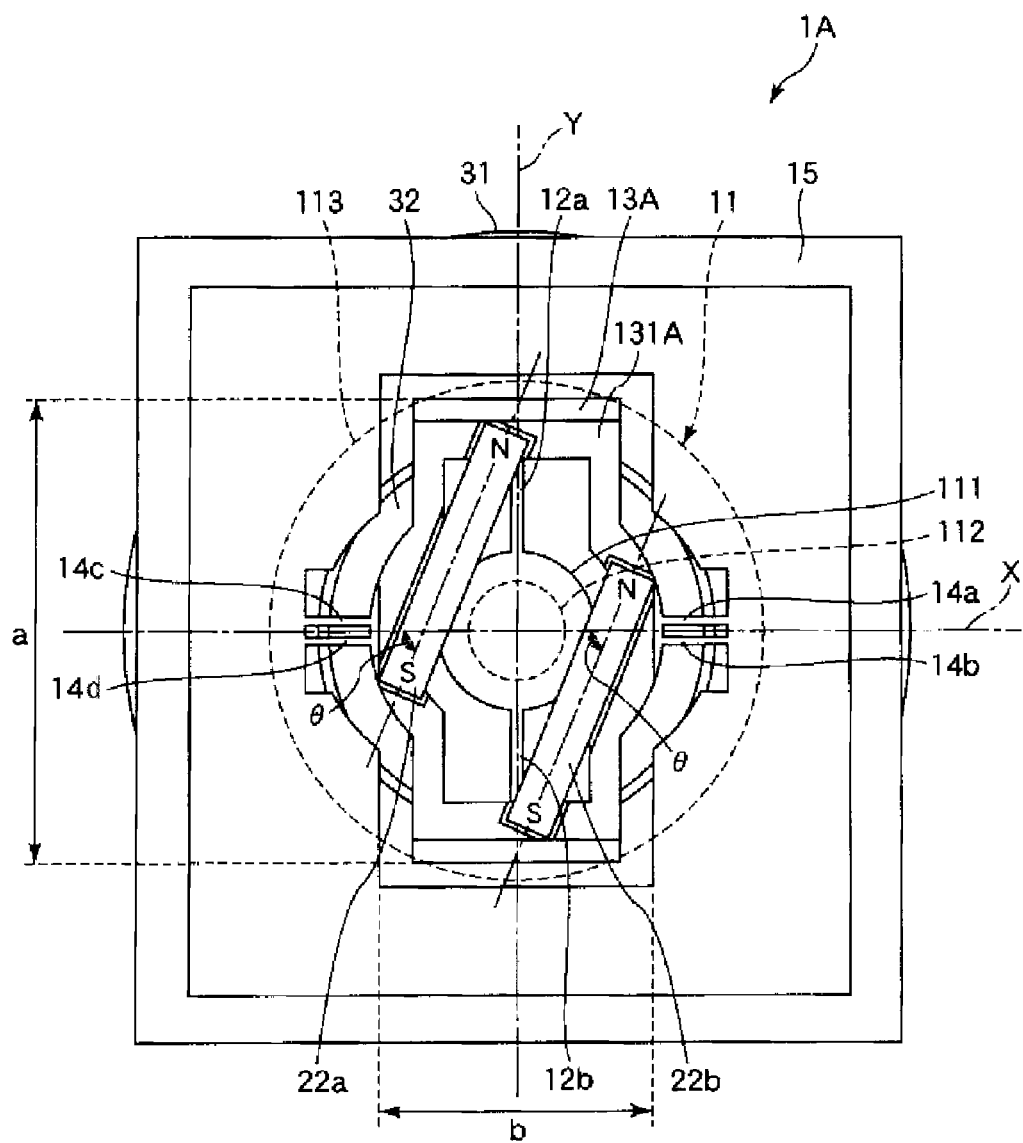
FIG. 5 is a plan view illustrating an optical scanner (optical device) according to a second embodiment of the invention.
Figure 6:
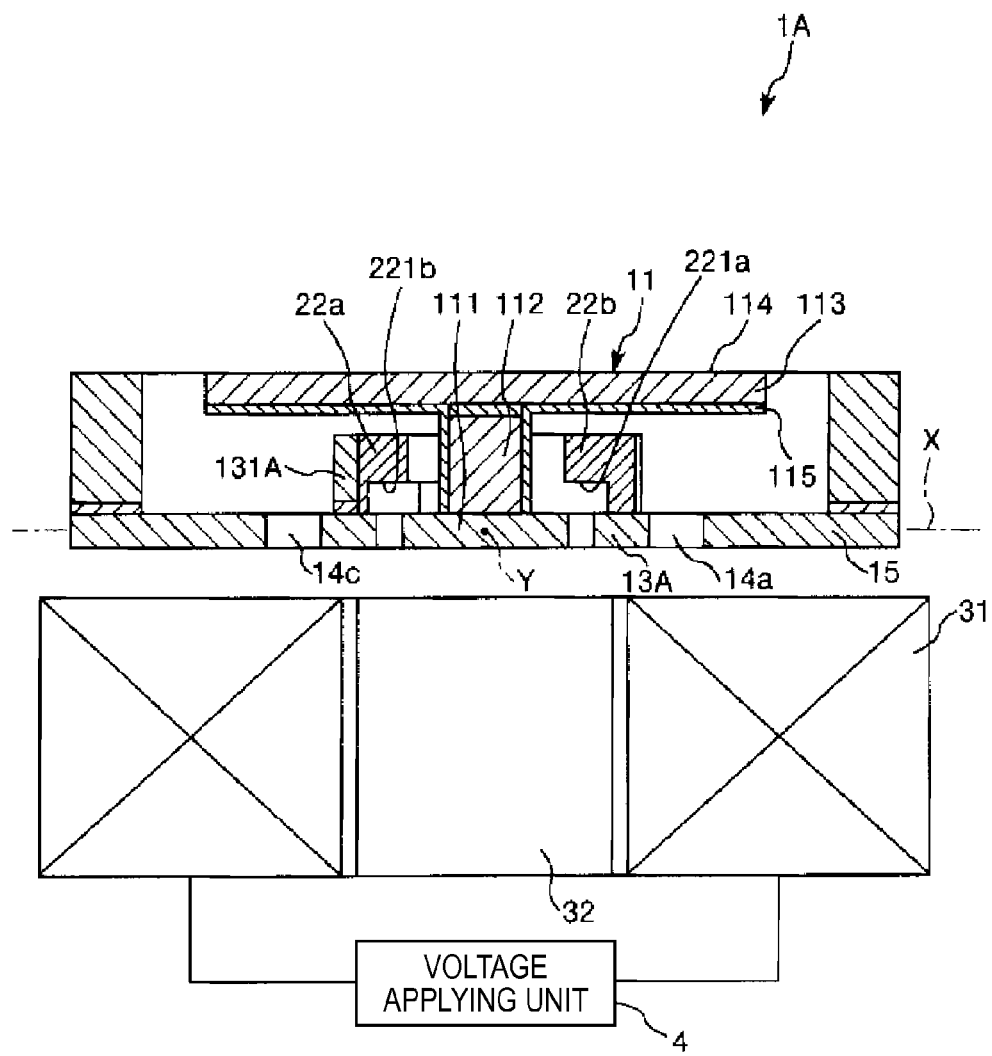
FIG. 6 is a cross-sectional view (a cross-sectional view taken along the X-axis) illustrating the optical scanner shown in FIG. 5.

FIG. 5 is a plan view illustrating an optical scanner (optical device) according to the second embodiment of the invention and FIG. 6 is a cross-sectional view (a cross-sectional view taken along the X-axis) illustrating the optical scanner shown in FIG. 5. Hereinafter, for convenience of explanation, the upper and lower sides of FIG. 6 are referred to as "upper" and "lower" sides.

Hereinafter, the second embodiment will be described with an emphasis on the difference from the first embodiment and the description of the same components as those in the first embodiment will not be repeated. In FIGS. 5 and 6, the same components as those in the first embodiment are denoted by the same reference numerals.

The optical scanner according to this embodiment is similar to the optical scanner according to the first embodiment except for the structure (shape) of the frame portion and the permanent magnets.

As shown in FIG. 5, an optical scanner 1A according to the second embodiment includes a frame portion 13A and permanent magnets 22a and 22b.

The frame portion 13A has a frame shape and is provided so as to surround a base portion 111 of a movable portion 11.

The frame portion 13A is supported by a supporting portion 15 through shaft portions 14a, 14b, 14c, and 14d. The base portion 111 of the movable portion 11 is supported by the frame portion 13A through shaft portions 12a and 12b.

In this embodiment, the frame portion 13A includes a rib 131A.

The rib 131A is formed in a region which does not overlap the permanent magnets 22a and 22b, as viewed from the thickness direction of the frame portion 13A. In this way, it is possible to bring the center of gravity of a vibration system (second vibration system) about the X-axis close to the X-axis. As a result, it is possible to smoothly rotate a light reflecting plate 113 about the X-axis.

The rib 131A is formed so as to regulate the movement of the permanent magnets 22a and 22b in a direction (a direction parallel to the X-axis and the Y-axis) vertical to the thickness direction of the frame portion 13A. In other words, the rib 131A includes a portion (guide portion) which is formed along the outer shape of the permanent magnets 22a and 22b in a plan view. Therefore, it is possible to easily provide the permanent magnets 22a and 22b with respect to the frame portion 13A.

The rib 131A is formed by processing a handle layer and a box layer of an SOI substrate such that a region in which the permanent magnets 22a and 22b are provided is excluded.

The permanent magnets 22a and 22b are fixed to apart of the frame portion 13A which is formed of a device layer.

In this embodiment, a concave portion 221a is formed in a portion of the permanent magnet 22a which faces the base portion 111. Similarly, a concave portion 221b is formed in a portion of the permanent magnet 22b which faces the base portion 111. The formation of the concave portions 221a and 221b makes it possible to prevent the contact of the base portion 111 with the permanent magnets 22a and 22b.

According to the optical scanner 1A of the second embodiment, it is possible to perform two-dimensional scanning with light while reducing the size of a device.

Third Embodiment

Next, a third embodiment of the invention will be described.

Figure 7:
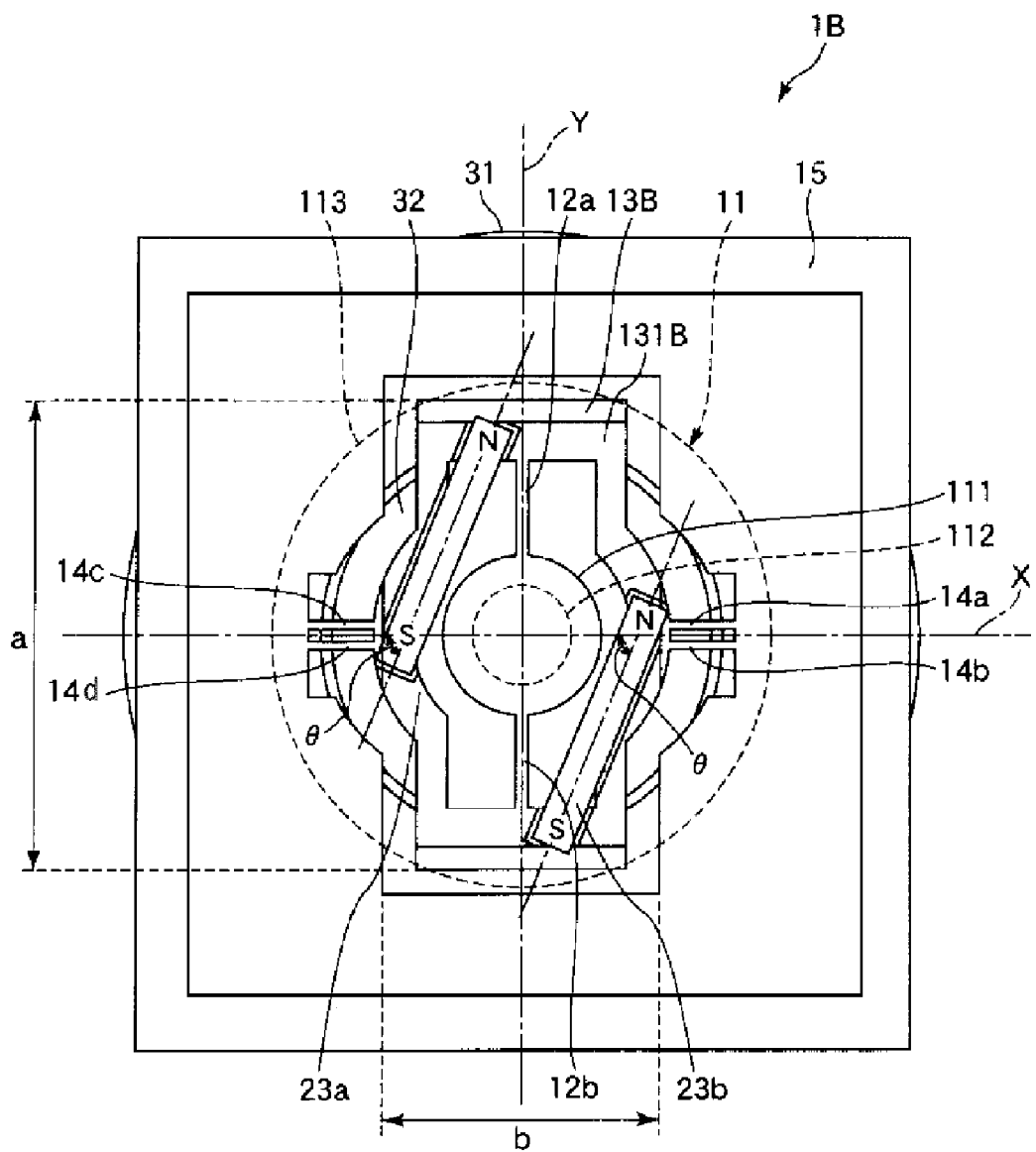
FIG. 7 is a plan view illustrating an optical scanner (optical device) according to a third embodiment of the invention.
Figure 8:
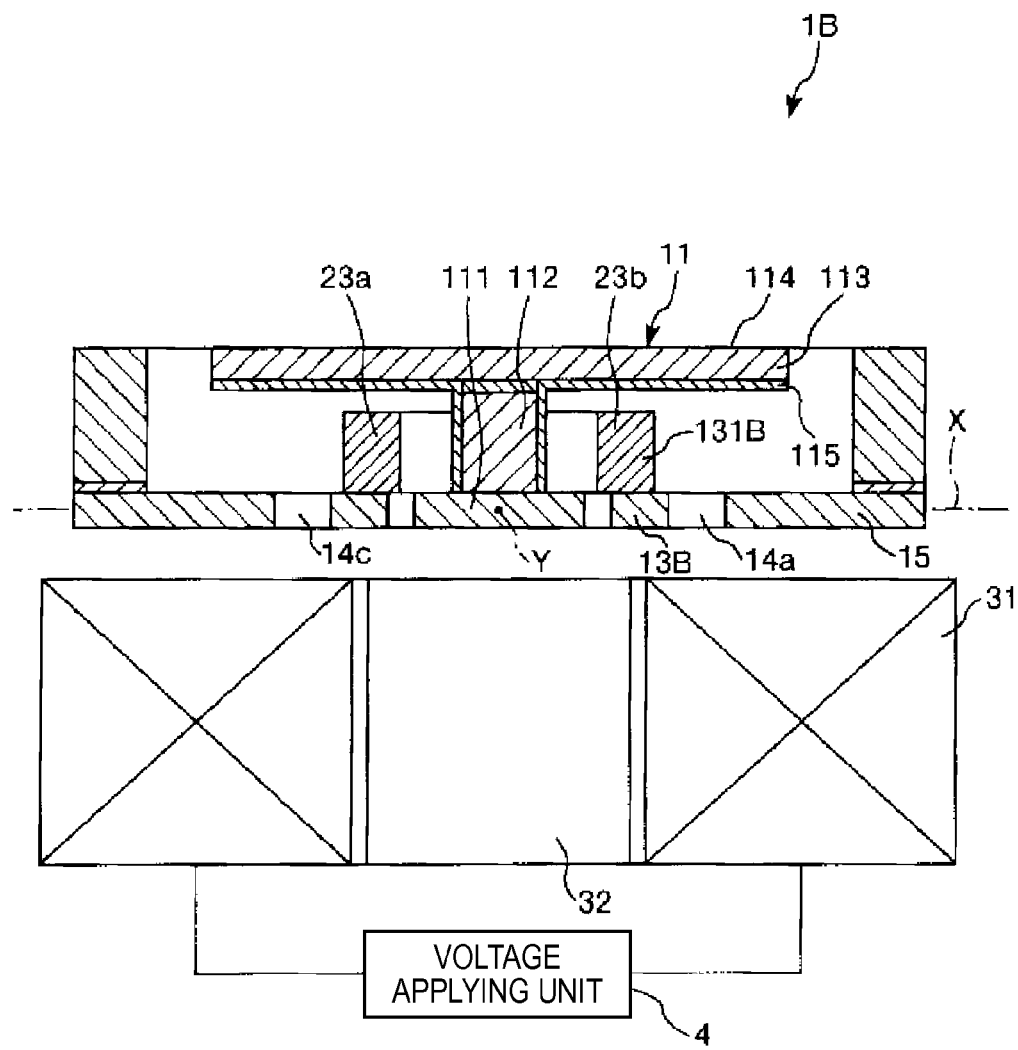
FIG. 8 is a cross-sectional view (a cross-sectional view taken along the X-axis) illustrating the optical scanner shown in FIG. 7.

FIG. 7 is a plan view illustrating an optical scanner (optical device) according to the third embodiment of the invention and FIG. 8 is a cross-sectional view (a cross-sectional view taken along the X-axis) illustrating the optical scanner shown in FIG. 7. Hereinafter, for convenience of explanation, the upper and lower sides of FIG. 8 are referred to as "upper" and "lower" sides.

Hereinafter, the third embodiment will be described with an emphasis on the difference from the first embodiment and the description of the same components as those in the first embodiment will not be repeated. In FIGS. 7 and 8, the same components as those in the first embodiment are denoted by the same reference numerals.

The optical scanner according to this embodiment is similar to the optical scanner according to the first embodiment except for the structure (shape) of the frame portion and the permanent magnets.

As shown in FIG. 7, an optical scanner 1B according to the third embodiment includes a frame portion 13B and permanent magnets 23a and 23b.

The frame portion 13B has a frame shape and is provided so as to surround a base portion 111 of a movable portion 11.

The frame portion 13B is supported by a supporting portion 15 through shaft portions 14a, 14b, 14c, and 14d. The base portion 111 of the movable portion 11 is supported by the frame portion 13B through shaft portions 12a and 12b.

In this embodiment, the frame portion 13B includes a rib 131B.

The rib 131B is formed in a region which does not overlap the permanent magnets 23a and 23b, as viewed from the thickness direction of the frame portion 13B. In this way, it is possible to bring the center of gravity of a vibration system about the X-axis close to the X-axis. As a result, it is possible to smoothly rotate the light reflecting plate 113 about the X-axis.

The rib 131B is formed so as to regulate the movement of the permanent magnets 23a and 23b in a direction vertical to the thickness direction of the frame portion 13B. In this way, it is possible to easily provide the permanent magnets 23a and 23b with respect to the frame portion 13B.

In this embodiment, the permanent magnets 23a and 23b are provided so as not to overlap the base portion 111 of the movable portion 11 in a plan view. In this way, it is possible to prevent the contact of the base portion 111 with the permanent magnets 23a and 23b.

According to the optical scanner 1B of the third embodiment, it is possible to perform two-dimensional scanning with light while reducing the size of a device.

Image Display Device According to Embodiment

Figure 9:
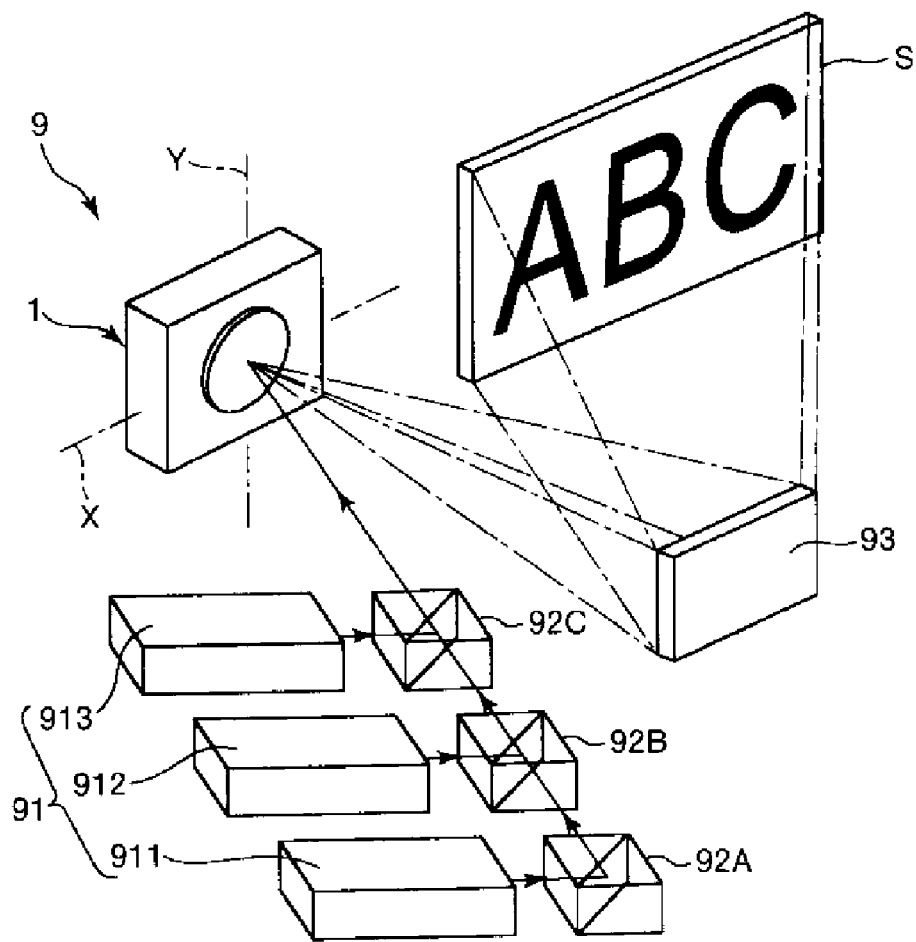
FIG. 9 is a diagram schematically illustrating an image display device according to an embodiment of the invention.

FIG. 9 is a diagram schematically illustrating an image display device according to an embodiment of the invention.

In this embodiment, a case in which the optical scanner 1 is used as an optical scanner of an imaging display which is an example of an image display device will be described. The lengthwise direction of a screen S is referred to a "lateral direction" and a direction perpendicular to the lengthwise direction is referred to as a "longitudinal direction". In addition, the X-axis is parallel to the lateral direction of the screen S and the Y-axis is parallel to the longitudinal direction of the screen S.

An image display device (projector) 9 includes a light source device (light source) 91 that emits light, such as a laser beam, a plurality of dichroic mirrors 92A, 92B, and 92C, and the optical scanner 1.

The light source device 91 includes a red light source device 911 that emits red light, a blue light source device 912 that emits blue light, and a green light source device 913 that emits green light.

The dichroic mirrors 92A, 92B, and 92C are optical elements that compose light components emitted from the red light source device 911, the blue light source device 912, and the green light source device 913.

The image display device 9 is formed such that the dichroic mirrors 92A, 92B, and 92C compose light emitted from the light source device 91 (the red light source device 911, the blue light source device 912, and the green light source device 913) on the basis of image information from a host computer (not shown), the optical scanner 1 performs two-dimensional scanning with the composed light, and a color image is formed on the screen S.

During two-dimensional scanning, the screen S is scanned in the lateral direction with light which is reflected from the light reflecting portion 114 by the rotation of the movable portion 11 of the optical scanner 1 about the Y-axis (main scanning). On the other hand, the screen S is scanned in the longitudinal direction with light which is reflected from the light reflecting portion 114 by the rotation of the movable portion 11 of the optical scanner 1 about the X-axis (sub-scanning).

In FIG. 9, after the optical scanner 1 performs two-dimensional scanning with light which is composed by the dichroic mirrors 92A, 92B, and 92C, the light is reflected from a fixed mirror 93 and an image is formed on the screen S. However, the fixed mirror 93 may be omitted and light which is used by the optical scanner 1 to perform two-dimensional scanning may be directly emitted to the screen S.

Next, image display devices according to application examples will be described.

Image Display Device According to Application Example 1

Figure 10:
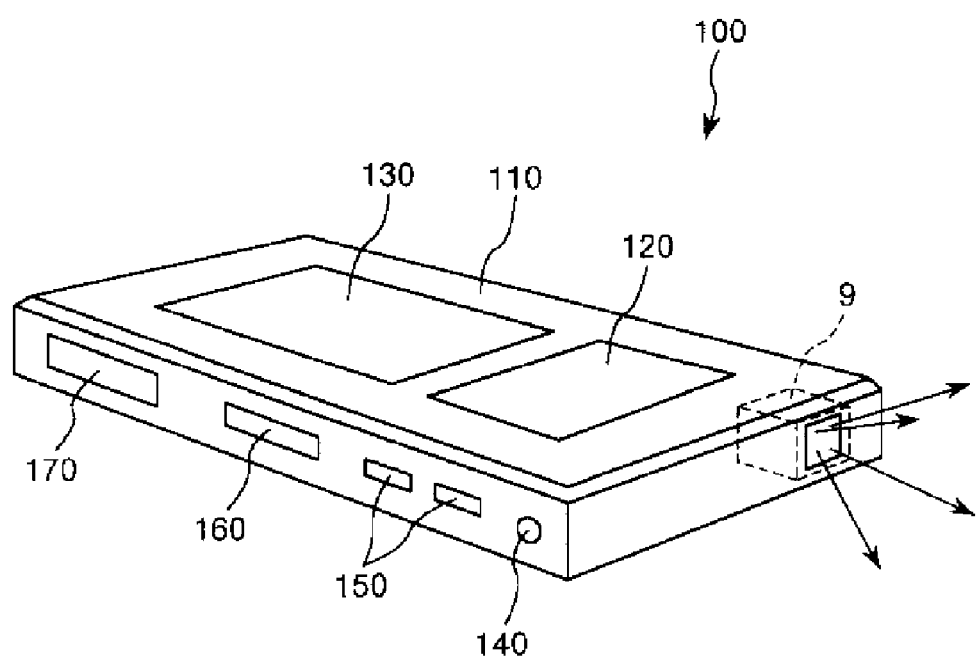
FIG. 10 is a perspective view illustrating an image display device according to Application Example 1 of the invention.

FIG. 10 is a perspective view illustrating an image display device according to Application Example 1 of the invention.

As shown in FIG. 10, the image display device 9 can be applied to a portable image display apparatus 100.

The portable image display apparatus 100 includes a casing 110 with dimensions which enables the user to hold the casing 110 with hand and an image display device 9 which is provided in the casing 110. It is possible to display a predetermined image on a predetermined surface, such as a screen or a desk, using the portable image display apparatus 100.

The portable image display apparatus 100 includes a display 120 which displays predetermined information, a keypad 130, an audio port 140, control buttons 150, a card slot 160, and an AV port 170.

The portable image display apparatus 100 may have other functions such as a communication function and a GPS reception function.

Image Display Device According to Application Example 2

Figure 11:
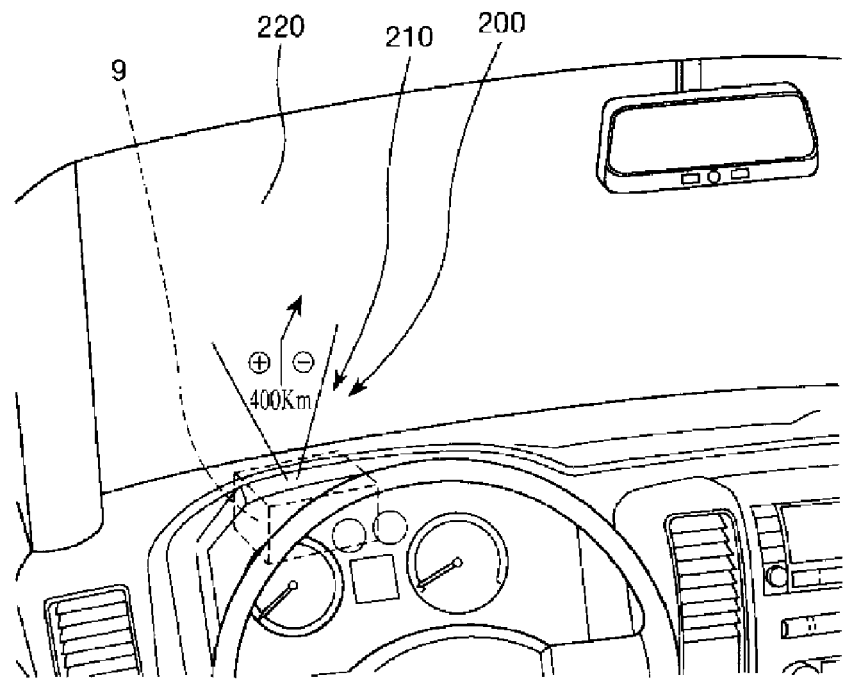
FIG. 11 is a perspective view illustrating an image display device according to Application Example 2 of the invention.

FIG. 11 is a perspective view illustrating an image display device according to Application Example 2 of the invention.

As shown in FIG. 11, the image display device 9 can be applied to a head-up display system 200.

In the head-up display system 200, the image display device 9 is provided in a dashboard of a vehicle so as to form a head-up display 210. The head-up display 210 can display a predetermined image, such as the image of a route to the destination, on a front glass 220.

The application of the head-up display system 200 is not limited to the vehicle, but the head-up display system 200 may be applied to, for example, airplanes and ships.

Image Display Device According to Application Example 3

Figure 12:
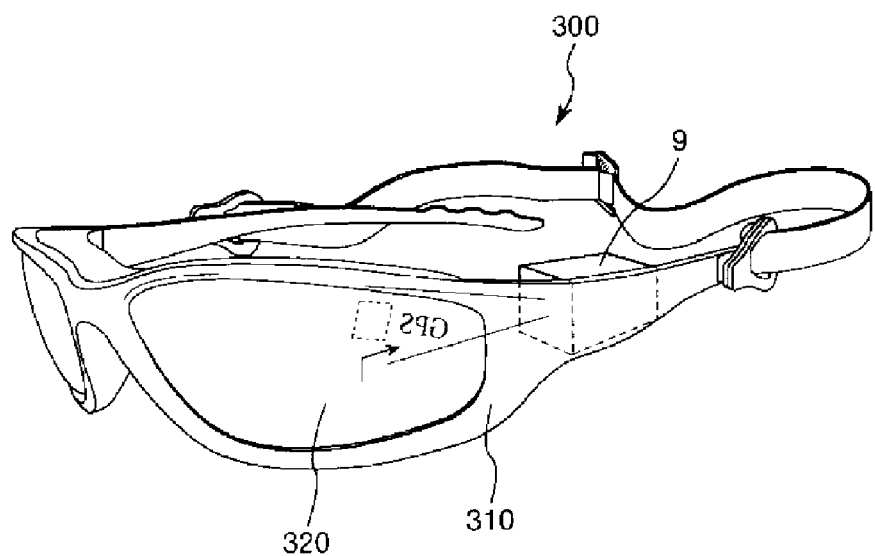
FIG. 12 is a perspective view illustrating an image display device according to Application Example 3 of the invention.

FIG. 12 is a perspective view illustrating an image display device according to Application Example 3 of the invention.

As shown in FIG. 12, the image display device 9 can be applied to a head-mounted display 300.

That is, the head-mounted display 300 includes glasses 310 and the image display device 9 provided in the glasses 310. The image display device 9 displays a predetermined image which is viewed by one eye on a display unit 320 which is provided in a portion of the glasses 310 corresponding to the original lens.

The display unit 320 may be transparent or opaque. When the display unit 320 is transparent, information from the image display device 9 may be added to information from the real world and the added information may be used.

The head-mounted display 300 may be provided with two image display devices 9 and images which are viewed by both eyes may be displayed on two display units.

The optical devices, the optical scanners, and the image display devices according to the embodiments of the invention have been described above with reference to the shown embodiments, but the invention is not limited thereto. For example, in the optical devices, the optical scanners, and the image display devices according to the embodiments of the invention, the structure of each unit may be replaced with any structure with the same function and any other structures may be added.

In the above-described embodiments of the invention, two or more arbitrary structures (features) may be combined with each other.

In the above-described embodiments, two (a pair of) first shaft portions are provided, but the invention is not limited thereto. For example, four or more (two or more pairs of) first shaft portions may be provided.

In the above-described embodiments, four (two pairs of) second shaft portions are provided but the invention is not limited thereto. For example, two (a pair of) second shaft portions or six or more (three or more pairs of) second shaft portions may be provided.

In the above-described embodiments, the light reflecting plate covers the entire first shaft portion, the entire frame portion, and the entire second shaft portion in a plan view. However, the light reflecting plate may cover at least a part of the first shaft portion (the base-side end of the movable portion) in a plan view. In this case, as described above, it is possible to reduce the size of the optical device, increase the area of the light reflecting plate, prevent the warping of the light reflecting plate, and prevent the generation of stray light due to the base-side end of the first shaft portion.

In the above-described embodiments, the SOI substrate is processed to form the light reflecting plate and the spacer. However, the invention is not limited thereto. For example, the light reflecting plate and the spacer may be formed from a separate substrate.

In addition, the spacer between the light reflecting plate and the base portion may be a soldering ball. In this case, for example, metal films may be formed on the spacer-side surfaces of the light reflecting plate and the base portion and the metal films may be bonded to each other by the soldering ball.

In the above-described embodiments, the optical device according to the invention is applied to the optical scanner. However, the invention is not limited thereto. For example, the optical device according to the invention may be applied to other optical devices such as a light switch and an optical attenuator.

In the above-described embodiments, the movable portion is rotated about two axes which are perpendicular to each other by the rotation and vibration of the frame portion. However, the invention is not limited thereto. For example, a unit which rotates the movable portion about the first axis may be provided separately from a unit which rotates the frame portion about the second axis. In this case, the unit which rotates the movable portion about the first axis may be, for example, a known driving type, such as a piezoelectric driving type, an electromagnetic driving type, or an electrostatic driving type.

The entire disclosure of Japanese Patent Application No. 2012-109185, filed May 11, 2012 is expressly incorporated by reference herein.

What is claimed is:

1. An optical device comprising:
   a movable portion that is rotatable about a first axis;
   a frame portion that is rotatable about a second axis intersecting the first axis;

a first shaft portion that supports the movable portion so as to be rotatable about the first axis with respect to the frame portion; and a permanent magnet that is provided in the frame portion, wherein the movable portion includes a base portion and a light reflecting plate which is fixed to the base portion and includes a light reflecting portion with a light reflecting property, the frame portion is provided so as to surround the base portion, the first shaft portion includes one end connected to the base portion and the other end connected to the frame portion, the light reflecting plate is provided so as to be separated from the first shaft portion in a thickness direction, the permanent magnet is fixed to a surface of the frame portion close to the light reflecting plate, wherein the permanent magnet is on the same side of the frame portion as the light reflecting plate, the permanent magnet is arranged such that one magnetic pole and the other magnetic pole are opposite to each other with the second axis interposed therebetween, as viewed from the thickness direction of the frame portion, the permanent magnet has a longitudinal shape and is magnetized in a longitudinal direction, and one end of permanent magnet is arranged on the first axis, as viewed from the thickness direction of the frame portion.

2. The optical device according to claim 1, wherein the base portion, the frame portion, and the first shaft portion are formed using a device layer of a Silicon-on-Insulator (SOI) substrate, and the light reflecting plate is provided on a handle layer side of the SOI substrate.

3. The optical device according to claim 1, wherein the light reflecting plate is fixed to the base portion through a spacer, and the permanent magnet is provided so as not to overlap the spacer, as viewed from the thickness direction of the light reflecting plate.

4. The optical device according to claim 3, wherein the permanent magnet includes a pair of permanent magnets which are opposite to each other with the spacer interposed therebetween.

5. The optical device according to claim 1, wherein a rib which protrudes toward the light reflecting plate is formed on the frame portion.

6. The optical device according to claim 5, wherein the permanent magnet is fixed to a top surface of the rib.

7. The optical device according to claim 5, wherein the rib is formed in a region which does not overlap the permanent magnet, as viewed from the thickness direction of the frame portion.

8. The optical device according to claim 7, wherein the rib is formed so as to regulate the movement of the permanent magnet in a direction perpendicular to the thickness direction of the frame portion.

9. The optical device according to claim 1, wherein the light reflecting plate is provided so as to overlap at least a part of the first shaft portion, as viewed from the thickness direction.

10. The optical device according to claim 9, wherein the light reflecting plate is formed so as to cover the entire first shaft portion, as viewed from the thickness direction.

11. The optical device according to claim 10, wherein the light reflecting plate is formed so as to cover the entire frame portion, as viewed from the thickness direction.

12. The optical device according to claim 11, further comprising:

a second shaft portion that includes one end connected to the frame portion and supports the frame portion so as to be rotatable about the second axis, wherein the light reflecting plate is formed so as to cover the entire second shaft portion, as viewed from the thickness direction.

13. The optical device according to claim 1, further comprising:

a coil that is provided opposite to the frame portion; and a voltage applying unit that applies a voltage to the coil, the voltage applying unit applies, to the coil, a superimposed voltage of a first voltage with a first frequency and a second voltage with a second frequency different from the first frequency, and the movable portion is rotated about the first axis at the first frequency and is rotated about the second axis at the second frequency.

* * * * *